United States Patent
Schneider

(10) Patent No.: US 11,588,416 B2
(45) Date of Patent: Feb. 21, 2023

(54) SILENT STICK-SLIP PIEZO MOTOR

(71) Applicant: Manfred Schneider, Santa Ana, CA (US)

(72) Inventor: Manfred Schneider, Santa Ana, CA (US)

(*) Notice: Subject to any disclaimer, the term of this patent is extended or adjusted under 35 U.S.C. 154(b) by 354 days.

(21) Appl. No.: 16/449,388

(22) Filed: Jun. 22, 2019

(65) Prior Publication Data

US 2020/0403535 A1    Dec. 24, 2020

(51) Int. Cl.
*H02N 2/06* (2006.01)
*H02N 2/02* (2006.01)

(52) U.S. Cl.
CPC ............. *H02N 2/062* (2013.01); *H02N 2/025* (2013.01)

(58) Field of Classification Search
CPC ........ H02N 2/062; H02N 2/025; H02N 2/101; H02N 2/0075
See application file for complete search history.

(56) References Cited

U.S. PATENT DOCUMENTS

2018/0171773 A1* 6/2018 Nessjoen ............... G05B 15/02

* cited by examiner

*Primary Examiner* — Emily P Pham
(74) *Attorney, Agent, or Firm* — John R. Ross; John R. Ross, III

(57) ABSTRACT

A stick-slip piezo motor. At least one voltage source is connected to a piezo motor. The piezo motor has at least one oscillating piezo element and at least one moving friction element connected to the oscillating piezo element. The moving friction element moves in a desired travel direction. A computer is programmed to control the voltage source to deliver voltage to the piezo motor at a predetermined frequency and amplitude to control the speed of the piezo motor. The computer is programmed to hold the frequency constant while varying the amplitude to adjust the speed of the piezo motor. In a preferred embodiment the computer is programmed to hold the frequency constant at an ultrasonic frequency. In another preferred embodiment the computer is programmed to hold the frequency constant at a value of 15 kHz or higher.

19 Claims, 10 Drawing Sheets

SILENT STICK-SLIP PIEZO MOTOR

The present invention relates to piezo motors, and in particular, to piezo motors that utilize a stick-slip mode of operation.

BACKGROUND OF THE INVENTION

Piezo motors are known. Typically, piezo motors are comprised of motors with many mm of available linear travel or any degree of rotational travel. Generally, a piezo element actuates a friction element that in turn moves a second friction element (sliding element). These piezo motors can be roughly separated into resonant and non-resonant types. Resonant type piezo motors exhibit high-speed, but are less stable at very high resolutions (nanometer to sub-nanometer range). Resonant piezo motors operate in the resonant frequency range of the piezo. Non-resonant piezo motors operate below the resonant frequency range of the piezo (and are often audible). Some of the non-resonant type piezo motors are based on the inertial or stick-slip principle and sometimes are able to achieve nano-meter resolutions. Exemplary prior art stick-slip piezo motors are discussed in detail in U.S. Pat. No. 8,593,033, issued to Applicant and all of which is incorporated by reference herein.

The main problem with conventional piezo motors based on the non-resonant, stick-slip principle is that the moving part of the actuator retracts slightly during the "slip" part of the actuation cycle which results in poor constant velocity behavior, lost efficiency and a decrease of the position control of the actuator. This behavior is especially pronounced at slow velocities. Another problem with the conventional piezo motor is that the available actuation force is limited to the achievable friction of the friction element attached to the piezo element, which needs to be limited to not cause significant retraction during the slip phase of the actuator.

For example, FIG. 1A shows prior art single-phase stick-slip piezo motor 140. AC voltage source 142 provides alternating current to piezo element 141. Piezo element 141 is rigidly connected to piezo base 146. Friction element 143 is rigidly attached to piezo element 141. Friction element 143 is pressed against sliding friction element 145.

During the stick phase of the cycle, piezo element 141 expands relatively slowly to the right so that friction force is not overcome and there is no slipping. During the slip phase of the cycle, piezo element 141 contracts to the left at a much faster rate to overcome the friction between friction element 143 and sliding friction element 145. The inertia of sliding friction element 145 is not overcome and there is slipping between friction element 143 and sliding friction element 145. Slipping is desired so that friction element 143 does not drag sliding friction element 145 backwards to the left. Stated differently, sliding friction element 145 presses against friction element 143 with sufficient force so that friction element 143 moves sliding friction element 145 during the stick phase of the oscillation yet also with such force so that friction element 143 does not significantly drag sliding friction element 145 backwards during the slip phase of the oscillation.

With prior art single-phase stick-slip piezo motors, there has been a problem with eliminating unwanted dragging during the slip phase. FIG. 1B shows a graphical representation of the resultant motion of a prior art stick-slip piezo motor as a function of time. As is clearly shown there is significant undesired retraction 153 during the slip phase of the cycle.

Multi-phase piezo motors are effective in eliminating unwanted drag during the slip phase. For example, FIG. 2 shows a simplified drawing of prior art multi-phase piezo motor 10. Piezo elements 1 and 2 are both rigidly connected to holding element 6. Friction elements 3 and 4 are both connected to piezo elements 1 and 2, respectively. Friction element 5 is pressed against friction elements 3 and 4. Sliding friction element 5 is the object being moved by piezo motor 10. Voltage source 12 is connected to piezo element 1. Voltage source 13 is connected to piezo element 2. Computer 14 is connected to voltage sources 12 and 13 and is programmed to control the output of voltage sources 12 and 13.

Piezo Element

Piezo elements 1 and 2 are multi-layer piezo elements that exhibit longitudinal expansion when a voltage is applied. A preferred piezo element is a 3×3×3 mm stack with a 1 micrometer expansion at 150V applied voltage.

Holding Element

As stated above piezo elements 1 and 2 are rigidly attached to holding element 6. Holding element 6 may be fixed or moving depending on the arrangement of the motor.

Oscillating Friction Elements

Friction elements 3 and 4 are fabricated from any material that causes friction when applied to sliding friction element 5. In a preferred embodiment, friction elements 3 and 4 are ceramic friction elements. When voltage is applied to piezo elements 1 and 2, the resultant oscillation of piezo elements 1 and 2 will cause friction element 5 to move in a predetermined manner.

Sliding Friction Element

Sliding friction element 5 is the object being moved by friction elements 3 and 4. Sliding friction element 5 is pressed against friction elements 3 and 4 with sufficient force so that friction elements 3 and 4 move friction element 5 during the stick phase of the oscillation yet also with such force so that friction elements 3 and 4 do not significantly drag friction element 5 backwards during the slip phase of the oscillation.

FIG. 3 shows a graphical representation illustrating the operation of the preferred embodiment of the present invention shown above in FIG. 2.

Cycle phase 1: Voltage sources 12 and 13 are applying voltage to elements 1 and 2 so that elements 1 and 2 are both expanding in the same direction (FIG. 3A). The applied voltage increases at a low enough rate so that the speed of the expansion is slow enough so that the friction force between friction elements 3 and 4 and sliding friction element 5 is not overcome. Therefore, there is no slipping between friction elements 3 and 4 and sliding friction element 5. Hence, both piezo element 1 and piezo element 2 are in the stick phase of motion causing sliding friction element 5 to move in a linear motion consistent with the linear motion of piezo elements 1 and 2 (FIG. 4).

Cycle Phase 2: Voltage source 12 is continuing to apply voltage with a slope slow enough to piezo element 1 so that it continues to expand in the same direction. However, the voltage from voltage source 13 drops to zero at a rapid rate causing piezo element 2 to contract at a rapid rate (FIG. 3B). Piezo element 2 contracts at such a rapid rate that the friction force between friction element 4 and sliding friction element 5 is significantly overcome. Hence, during cycle phase 2 piezo element 1 is still in the stick phase but piezo element 2 is now in the slip phase. The inertia of sliding friction element 5 and the forward motion of piezo element 1 counteracts and overcomes most of the reverse motion imparted by piezo element 2. Hence during Cycle Phase 2, there is only a very slight dip 15 to the resultant motion curve (FIG. 4).

Cycle Phase 3: Voltage sources 12 and 13 are applying voltage to elements 1 and 2 so that elements 1 and 2 are both expanding in the same direction (FIG. 3C). The applied voltage increases at a low enough rate so that the speed of the expansion is slow enough so that the friction force between friction elements 3 and 4 and sliding friction element 5 is not overcome. Therefore, there is no slipping between friction elements 3 and 4 and sliding friction element 5. Hence, both piezo element 1 and piezo element 2 are in the stick phase of motion causing sliding friction element 5 to move in a linear motion consistent with the linear motion of piezo elements 1 and 2.

Cycle Phase 4: Voltage source 13 is continuing to apply voltage with a slope slow enough to piezo element 2 so that it continues to expand in the same direction. However, the voltage from voltage source 12 drops to zero at a rapid rate causing piezo element 1 to contract at a rapid rate (FIG. 3D). Piezo element 1 contracts at such a rapid rate that the friction force between friction element 3 and sliding friction element 5 is significantly overcome, but not entirely. Hence, during cycle phase 2 piezo element 2 is still in the stick phase but piezo element 1 is now in the slip phase. The inertia of sliding friction element 5 forward motion of piezo element 2 counteracts and overcomes most of the reverse motion imparted by piezo element 1. Hence during Cycle Phase 4, there is only a very slight dip 16 to the resultant motion curve (FIG. 4).

Cycle Phase 5: The motion in cycle phase 5 is similar to that described above in reference to cycle phase 1. Accordingly, the cycles continue to repeat until the command signals are altered.

Command Signal Linearized

FIG. 5 shows a graphical representation similar to that depicted in FIG. 3. However, in FIG. 5 the command signals from computer 14 (FIG. 2) have been linearized. Linearization of the command signals is preferred because the resultant motion is more linear with less slippage.

Unpleasant Noise Associated with Operation of Prior Art Stick-Slip Piezo Motor Ultrasonic sound waves are sound waves having frequencies that are higher than the upper audible limit of human hearing. The human hearing range is commonly given as 20 Hz to 20 kHz. It should be noted that there is considerable variation between individuals, especially at high frequencies, and a gradual loss of sensitivity to higher frequencies with age is considered normal. For example, a middle-aged man or an older man may have a high frequency limit of 15 kHz.

A disadvantage of prior art stick-slip piezo motors is that they are audible, unlike resonant/ultrasonic piezo motors. The audible frequencies are determined by the commanded speed. Since achievable speeds for stick slip piezo motors are typically less than 20 mm/s, the resulting frequencies are typically less than 20 kHz. In order to be silent, the piezo motor speed would have to be commanded to move at a frequency that is outside the audible range, which is not feasible if lower speeds, typically less than 15 mm/s or 15 kHz are required.

Stick-slip motors are ideal for medical devices, laboratory instruments, consumer devices and many other areas due their miniature size, low power, high resolution, and simple construction. Examples include insulin pumps, camera focusing, blood and cancer analysis machines, lasers, and other similar devices. Humans are close to many of these uses and the unpleasant frequencies exhibited by stick-slip motors are annoying and unpleasant.

For example, FIG. 1B shows a traditional saw tooth voltage with fixed amplitude and variable frequency. The piezo expands linearly in phase 1 and then and quickly retracts in phase 2. The frequency of the saw tooth determines the speed of the motion. For example, if the piezo expands 1 um for every full saw tooth and the commanded speed is 1 mm/s, then the frequency would be 1000 Hz. That frequency is audible and varies with commanded speed.

What is needed is a stick-slip piezo motor that operates at a frequency level that is comfortable to human hearing.

SUMMARY OF THE INVENTION

The present invention provides a stick-slip piezo motor. At least one voltage source is connected to a piezo motor. The piezo motor has at least one oscillating piezo element and at least one moving friction element connected to the oscillating piezo element. The moving friction element moves in a desired travel direction. A computer is programmed to control the voltage source to deliver voltage to the piezo motor at a predetermined frequency and amplitude to control the speed of the piezo motor. The computer is programmed to hold the frequency constant while varying the amplitude to adjust the speed of the piezo motor. In a preferred embodiment the computer is programmed to hold the frequency constant at an ultrasonic frequency. In another preferred embodiment the computer is programmed to hold the frequency constant at a value of 15 kHz or higher.

DETAILED DESCRIPTION OF THE PREFERRED EMBODIMENTS

Figure 1A:
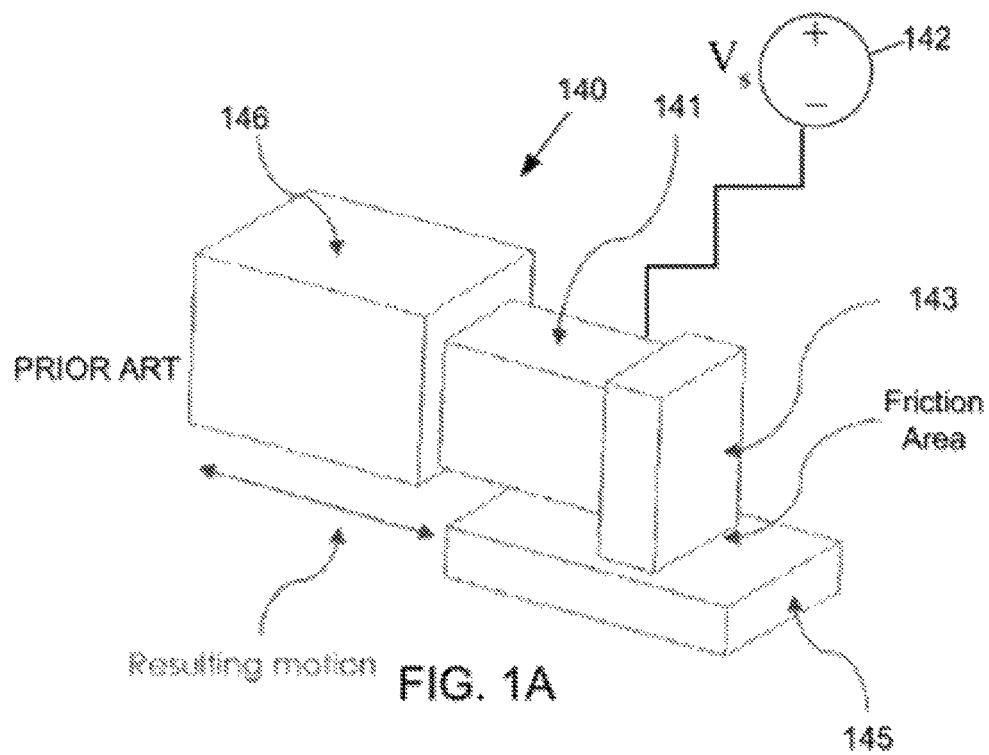
FIG. 1A shows a prior art single phase stick-slip piezo motor.
Figure 2:
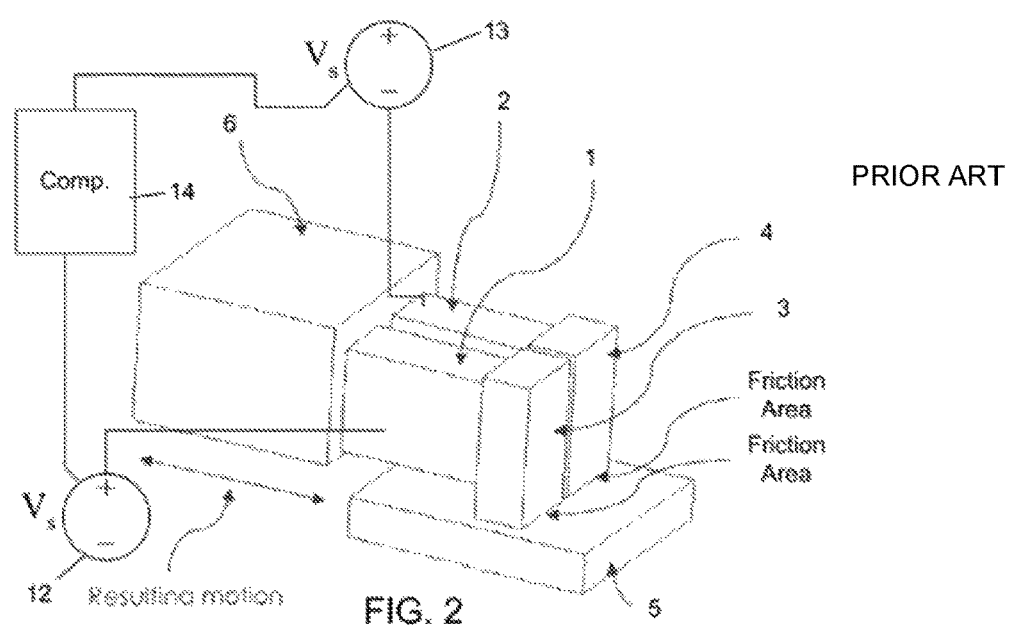
FIG. 2 shows a prior art multi-phase stick-slip piezo motor.
Figure 1B:
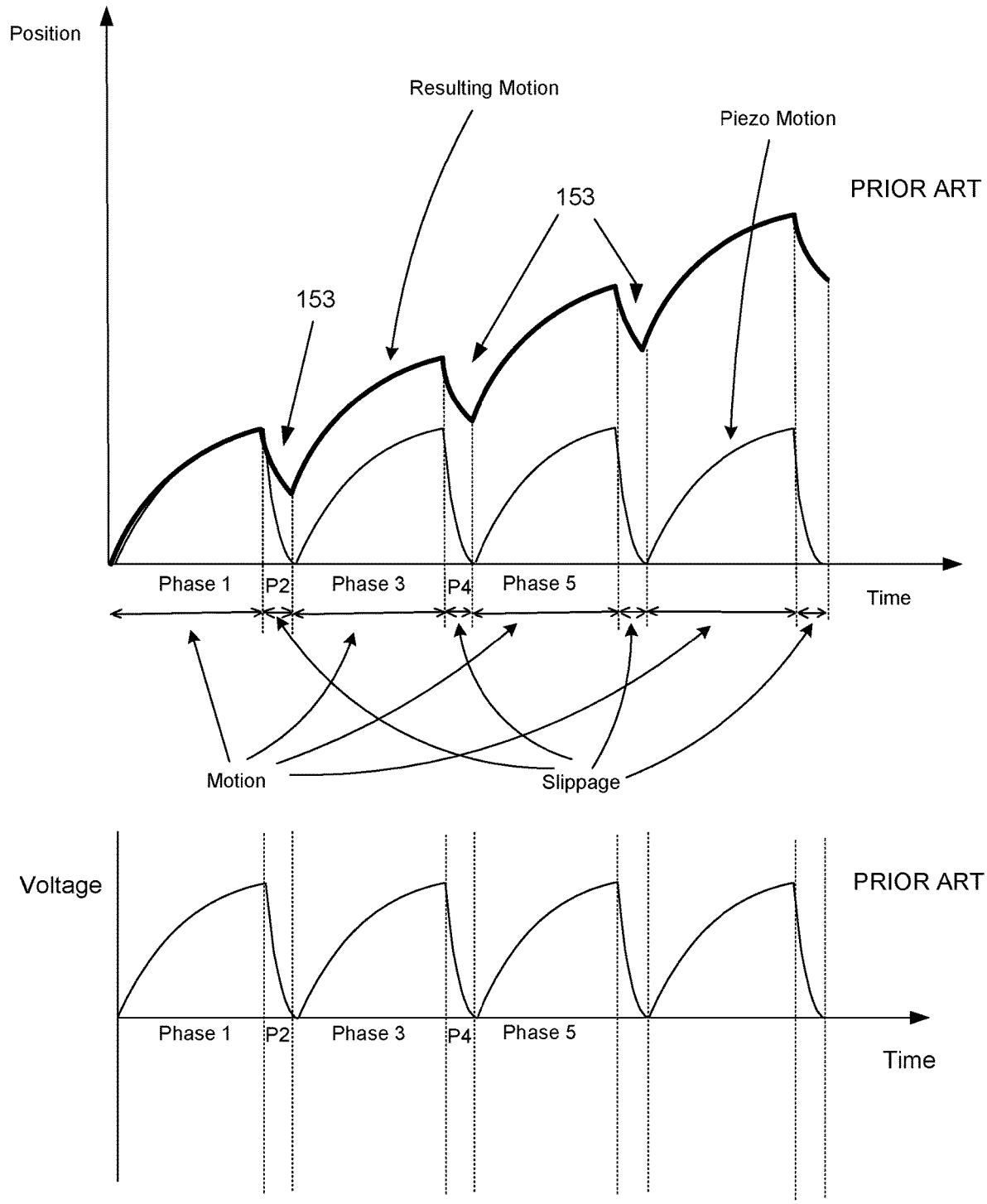
FIG. 1B shows a graph depicting the resultant motion caused by a prior art stick-slip piezo motor.
Figure 3A:
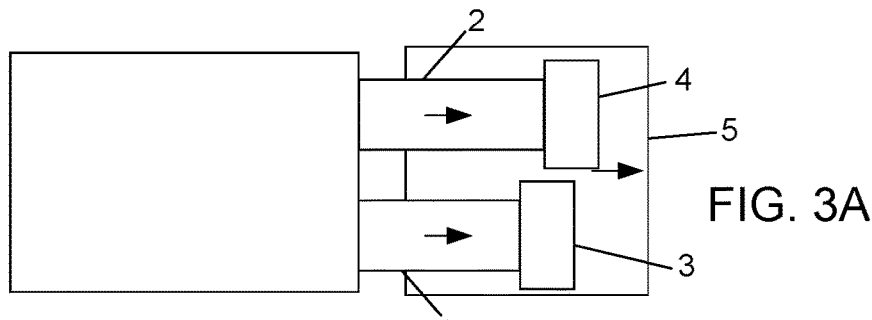
FIGS. 3A-3E shows a prior art depiction of resultant motion of the sliding friction element of the piezo motor of FIG. 2.
Figure 3B:
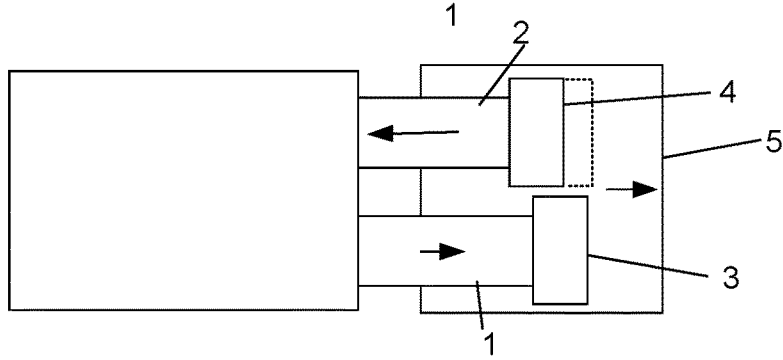
Figure 3C:
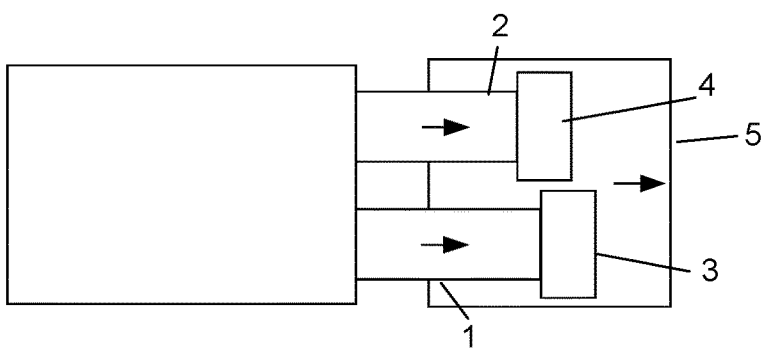
Figure 3D:
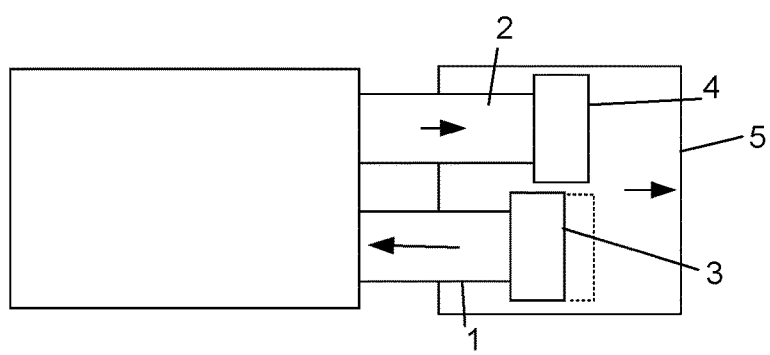
Figure 3E:
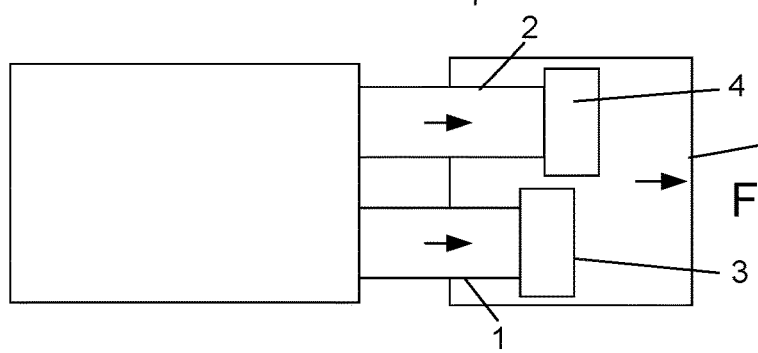
Figure 4:
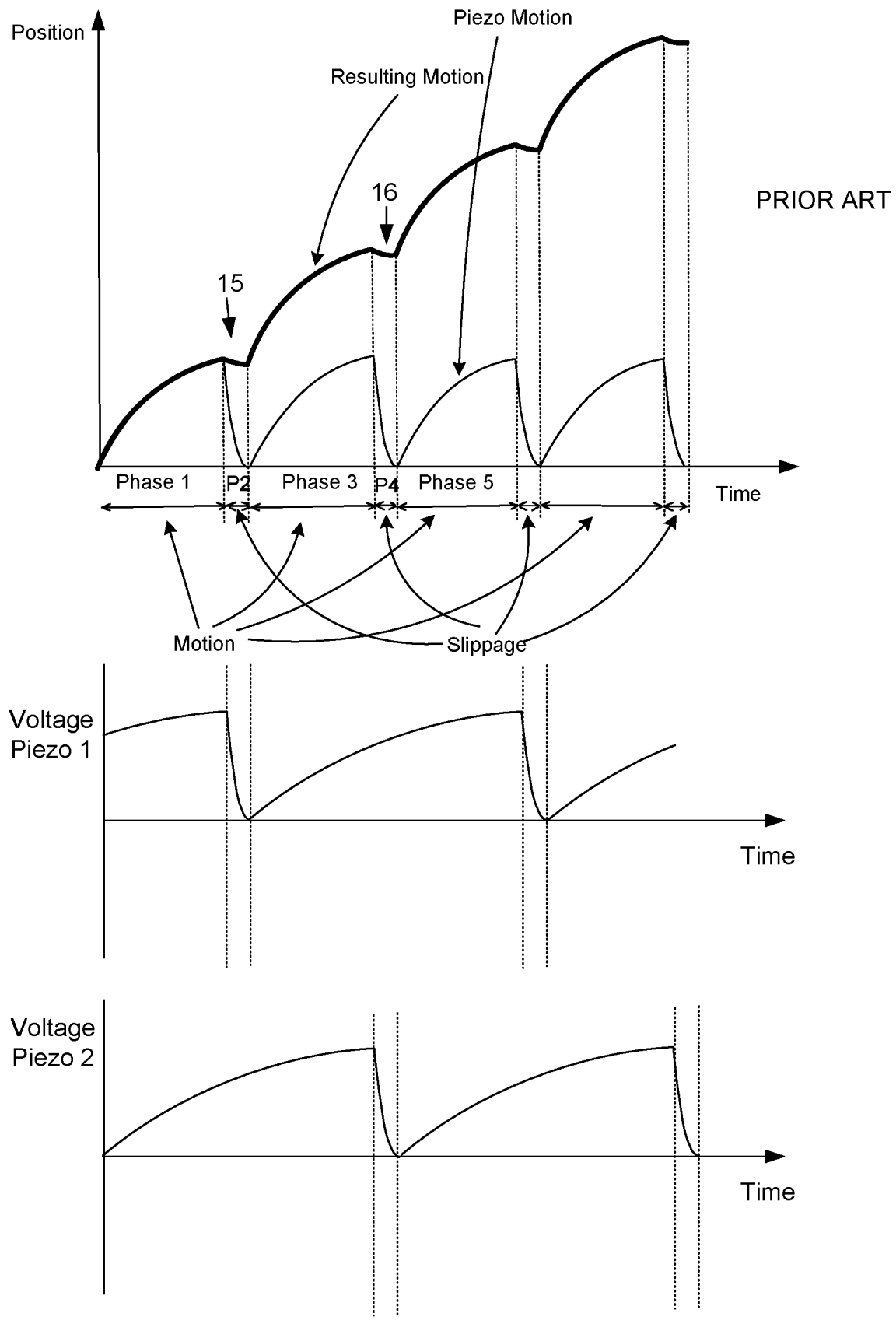
FIG. 4 shows a prior art graphical representation describing the resultant motion of the sliding friction element of the piezo motor of FIG. 2.
Figure 5:
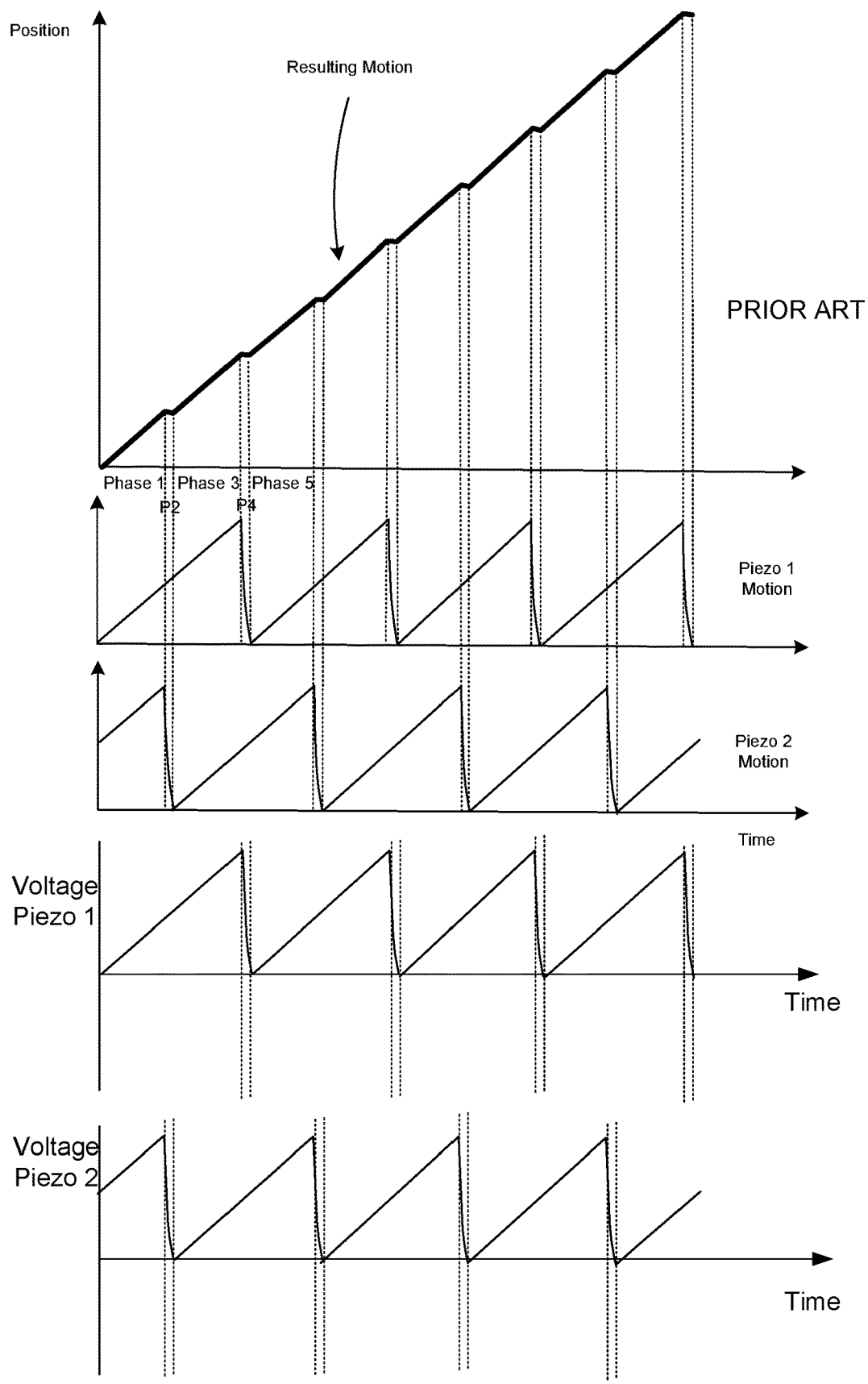
FIG. 5 shows a prior art linearized graphical representation of the resultant motion of the sliding friction element of the piezo motor of FIG. 2.
Figure 6:
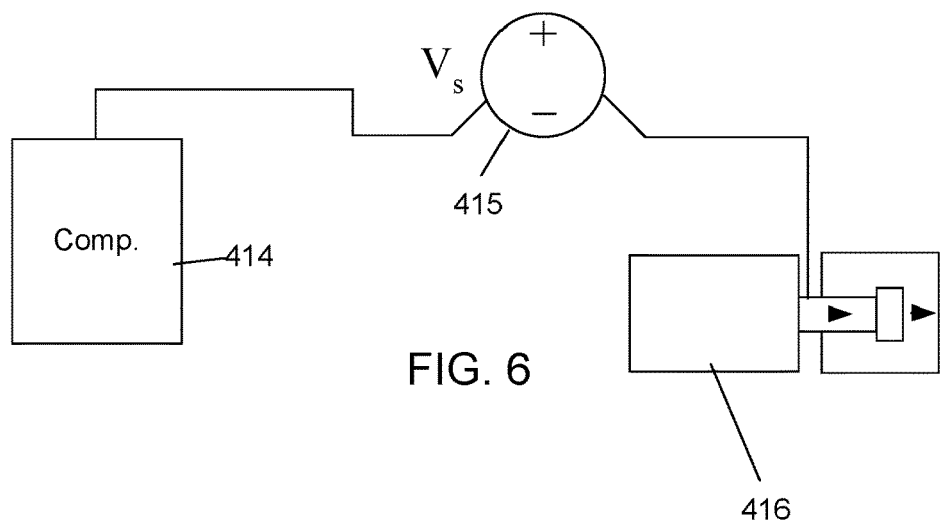
FIG. 6 shows a preferred embodiment of the present invention.

Variable amplitude/fixed frequency (single phase motor) FIG. 6 shows a preferred embodiment of the present invention. Computer 414 is programmed to hold the frequency of voltage source 415 constant at an ultrasonic level (15 kHz or higher). The speed of stick-slip piezo motor 416 is adjusted by varying the amplitude of the voltage of voltage source 415.

Figure 7A:
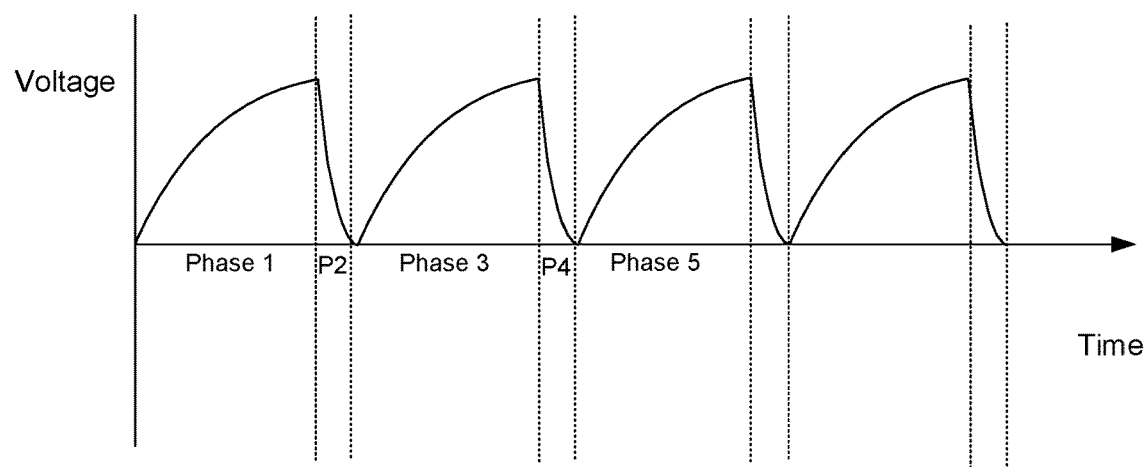
FIGS. 7A and 7B show a graphical comparison of the effects of variable amplitude.
Figure 7B:
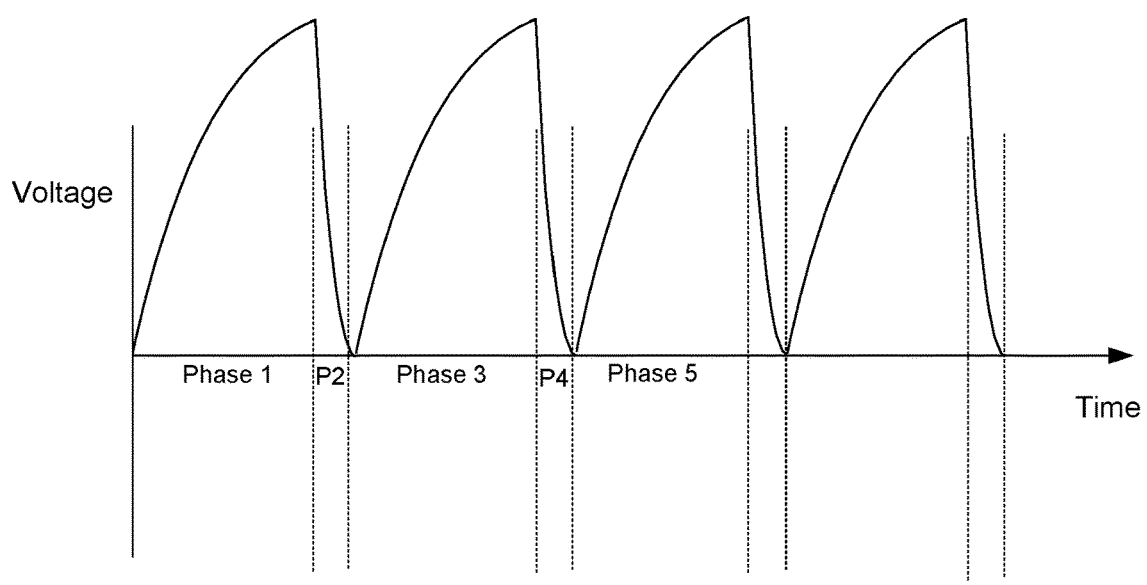

For example, FIGS. 7A and 7B shows waveforms at the same frequency (20 kHz), which is not audible by the human ear. Waveform 420 has an amplitude of 10V, whereas waveform 421 has an amplitude of 20V. Therefore, the resulting piezo expansion of waveform 421 is twice that of waveform 420. In other words, doubling the amplitude while holding the frequency constant has allowed the operator to double the speed of piezo motor 416. This method allows speed regulation of the piezo motor through amplitude adjustment rather than frequency adjustment. Therefore, the motor is not audible at any speed.

Variable Amplitude/Fixed Frequency (Multi-Phase Motor)

Figure 8:
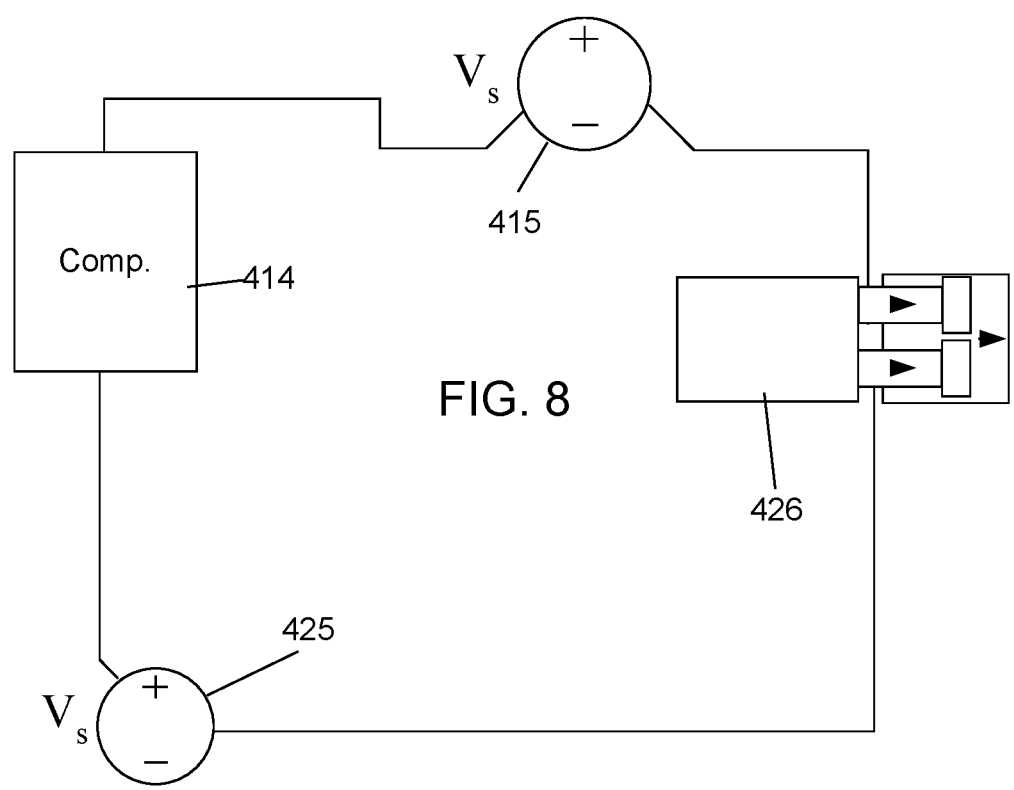
FIG. 8 shows a preferred embodiment of the present invention.

FIG. 8 shows another preferred embodiment of the present invention. Computer 414 is programmed to hold the frequency of voltage source 415 constant at an ultrasonic level (15 kHz or higher). The speed of multi-phase stick-slip piezo motor 426 is adjusted by varying the amplitude of the voltages of voltage sources 415 and 425.

Figure 9:
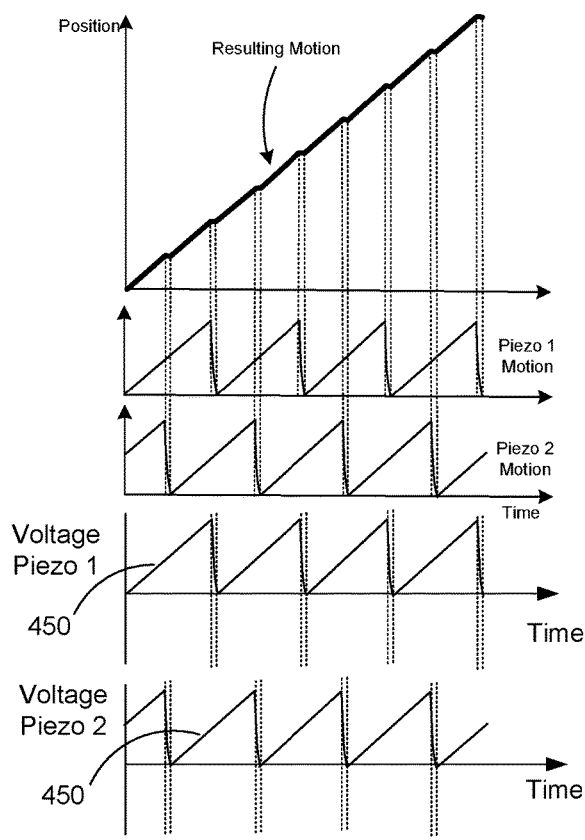
FIGS. 9 and 10 show a graphical comparison of the effects of variable amplitude.
Figure 10:
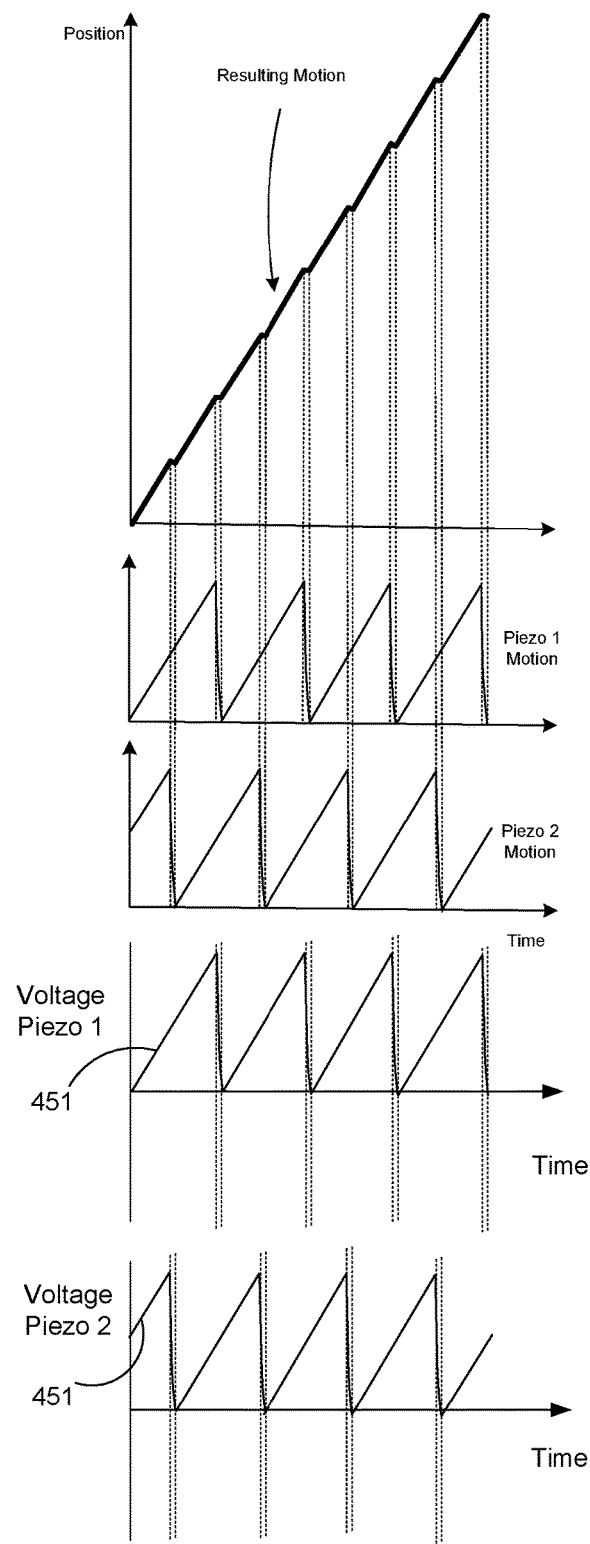

For example, FIGS. 9 and 10 shows waveforms at the same frequency (20 kHz), which is not audible by the human ear. Waveforms 450 have an amplitude of 10V, whereas waveforms 451 have an amplitude of 20V. Therefore, the resulting piezo expansions of waveforms 451 is twice that of waveforms 450. In other words, doubling the amplitude while holding the frequency constant has allowed the operator to double the speed of piezo motor 426. This method allows speed regulation of the piezo motor through amplitude adjustment rather than frequency adjustment. Therefore, the motor is not audible at any speed.

Mixed Frequency/Amplitude Mode (Single Phase Motor)

Fixed Frequency Mode

When Speed=0

Figure 11:
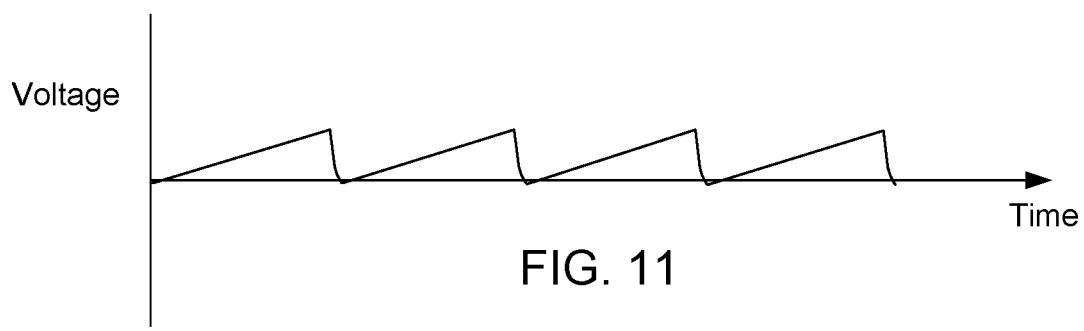
FIGS. 11 and 12 show slip back when operating at low amplitude.
Figure 12:
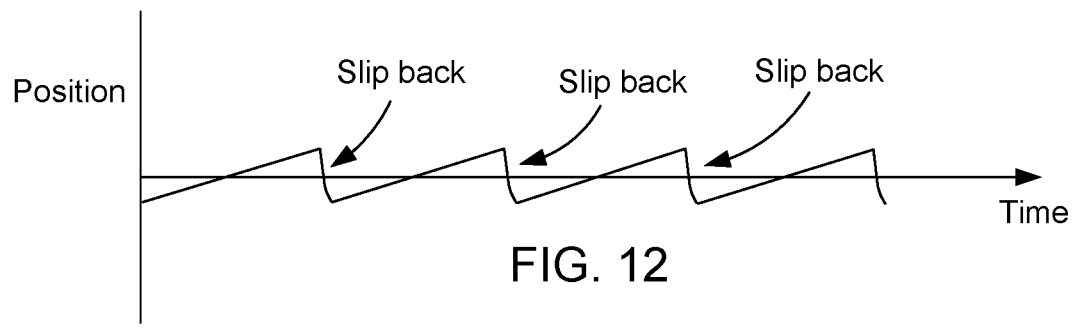

A drawback of the fixed frequency mode is that the piezo motor is always driven at a fixed frequency and therefore always draws current. This holds true even when the piezo motor is standing still and even though the amplitude of the voltage is very small. This is due to the fact that there is always some slip back as part of the saw tooth waveform (FIGS. 11-12). Therefore, at an average speed of zero, there needs to be the same forward motion as is exhibited during slip back. This causes the motor to heat approximately to the square of the average current.

Fixed Amplitude Mode

When Speed=0

Figure 13:
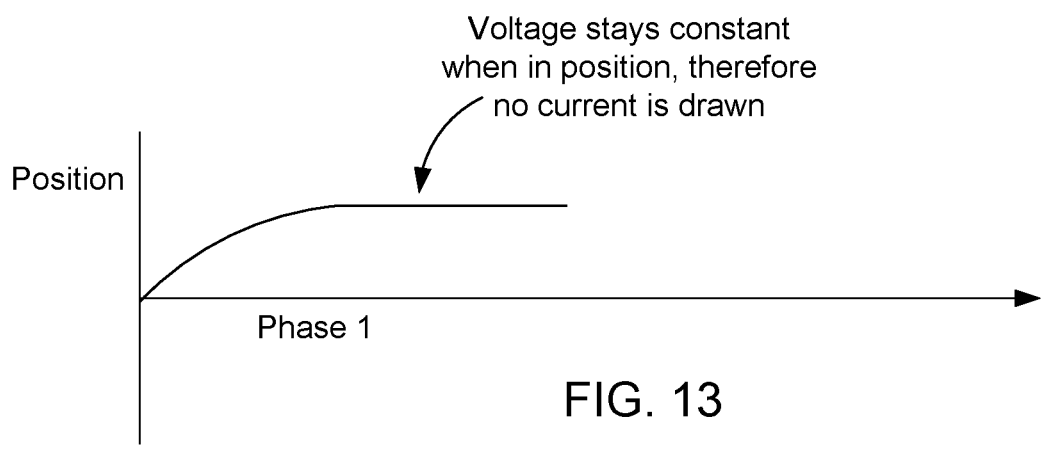
FIG. 13 shows fixed amplitude/variable frequency mode when speed is zero.

Fixed amplitude/variable frequency is preferred when operating at very slow speeds or when speed is at zero. In order to achieve an average speed of zero in fixed amplitude mode, the voltage to the motor is held constant and the motor draws negligible current. Therefore, negligible power is consumed (FIG. 13).

Figure 14:
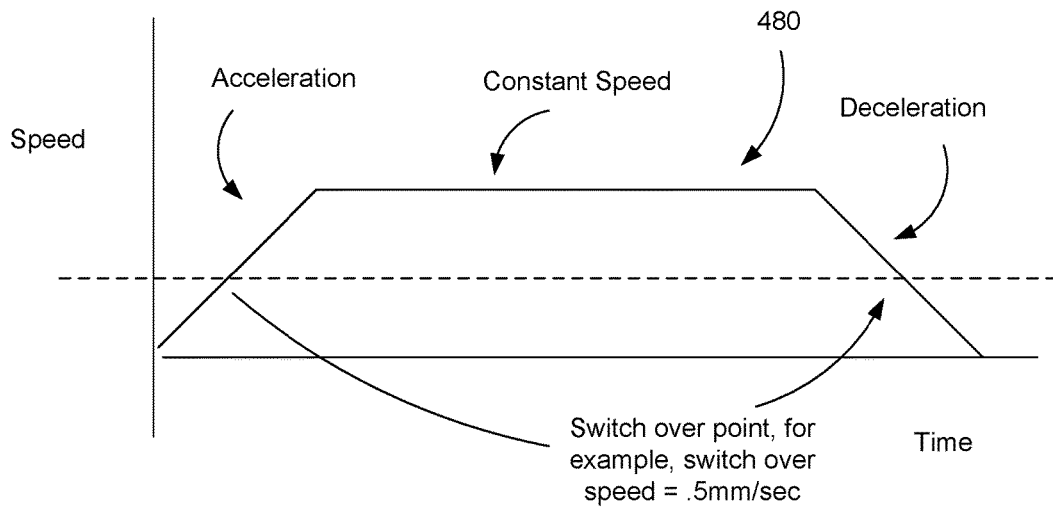
FIGS. 14-15 show a mixed frequency/amplitude mode operation during acceleration, constant speed and deceleration.
Figure 15:
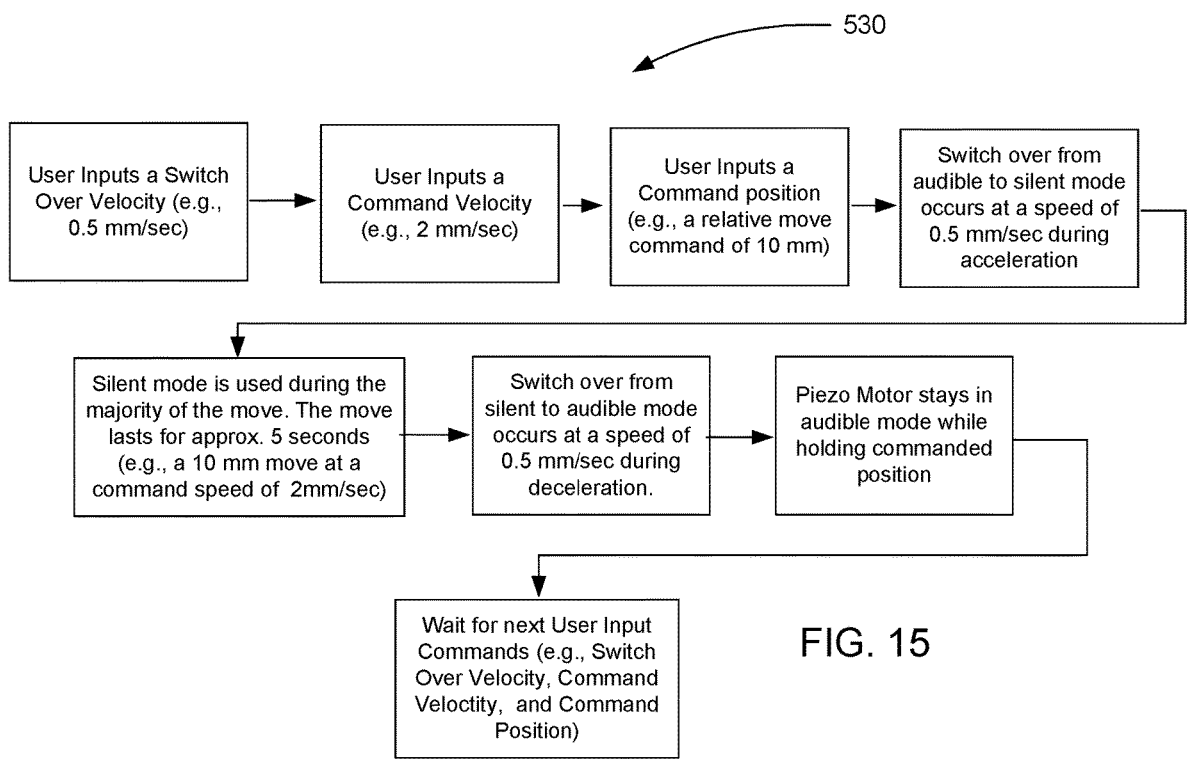

Another preferred embodiment of the present invention is shown in FIGS. 14-15. FIG. 14 shows a graph that depicts the speed of motor 426 (FIG. 8) as a function of time and FIG. 15 shows flowchart 530. As shown, motor 426 accelerates until it gets to constant speed and then decelerates when the motor is in position and comes to a stop. In the preferred embodiment shown in FIGS. 14-15, computer 414 is programmed to operate motor 426 so that the silent nature of the fixed frequency mode is combined with the low power and high stability of the fixed amplitude mode. Computer 414 is programmed to allow not only adjustment of the fixed frequency to optimize motion at higher speeds based on piezo characteristics, but also an adjustable switch over speed to allow for fixed amplitude mode operation during the beginning of acceleration and then the end of the deceleration.

In FIGS. 14-15 computer 414 is programmed to operate at fixed amplitude and variable frequency (audible mode) during the first portion of the acceleration mode. Computer 414 is also programmed to operate at variable amplitude and fixed frequency (silent mode) during the second portion of the acceleration mode, the constant speed mode, and during the first portion of the deceleration mode. Computer 414 is also programmed operate at fixed amplitude and variable frequency (audible mode) during the last portion of said deceleration mode.

As shown when using trapezoidal velocity profile 480, computer 414 switches from fixed amplitude mode at 0.5 mm/s to fixed frequency and back. This not only makes the motor more efficient at stand still, but also creates a more stable control loop due to the elimination of constant back and forth motion at zero average speed caused by the effect described above and shown in FIGS. 11-12.

Frequency Level is Programmable

The above preferred embodiments discussed utilizing computer 414 to operate piezo motors at a constant frequency that is ultrasonic (i.e., at a frequency level that is higher than the upper audible limit of human hearing). It should be noted that the specific frequency utilized is variable and programmable and may be chosen and modified as appropriate. In one preferred embodiment the frequency of voltage source 415 is held constant at 20 kHz. In another preferred embodiment the frequency of voltage source 415 is held constant at 15 kHz.

Other preferred embodiments recognize that although some frequencies may be audible, the frequency sound heard is not unpleasant or irritating. Therefore, the piezo motor may still be used in the presence of a human without causing distress and irritation. For example, in another preferred embodiment computer 414 is programmed to hold the frequency of voltage source 415 constant at 13.5 kHz. The frequency emitted is audible to a human nearby, however it is neither irritating nor unpleasant.

Piezo Motor Types

The present invention may be utilized with a variety of stick-slip piezo motor types. For example, in addition to the single phase and multi-phase motors discussed above, the present invention may also be utilized with:
1) a piezo motor where two piezo elements are connected to the opposite side of the piezo housing,
2) a piezo motor where the travel direction is rotational,
3) a piezo motor where the piezo motor allows for planar movement of the moving friction element,
4) a piezo motor having three or more piezo elements,
5) a piezo motor where the friction elements are ceramic friction elements,
6) a piezo motor where the moving friction element is a sliding friction element, and
7) a piezo motor where the moving friction element is a rotational friction element. Examples of these embodiments are clearly described in U.S. Pat. No. 8,593,033. This list is illustrative and not all-inclusive. The above described invention may be utilized with other types of stick-slip piezo motors also.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A stick-slip piezo motor system, comprising:
   A. at least one voltage source,
   B. a piezo motor electrically connected to said at least one voltage source, said piezo motor comprising:
      i. at least one oscillating piezo element,
      ii. at least one moving friction element connected to said at least one oscillating piezo element, said at least one moving friction element for moving in a desired travel direction, and
   C. a computer programmed to control said at least one voltage source to deliver voltage to said piezo motor at a predetermined frequency and amplitude to control a speed of said piezo motor, wherein said computer is programmed to hold said predetermined frequency constant while said amplitude is varied to adjust the speed of said piezo motor.

2. The stick-slip piezo motor system as in claim 1, wherein said predetermined frequency is an ultrasonic frequency.

3. The stick-slip piezo motor system as in claim 1, wherein said predetermined frequency is greater than or equal to 15 kHz.

4. The stick-slip piezo motor system as in claim 1, wherein said predetermined frequency is audible and pleasant to a human.

5. The stick-slip piezo motor system as in claim 1, wherein said piezo motor is a single-phase motor.

6. The stick-slip piezo motor system as in claim 5, wherein said piezo motor first accelerates during an acceleration mode, then operates at a constant speed during a constant speed mode, and then decelerates during a deceleration mode, wherein said computer is programmed to operate at a fixed amplitude and a variable frequency during at least a portion of said acceleration mode, wherein said computer is programmed to operate at a variable amplitude and a fixed frequency during said constant speed mode, and wherein said computer is programmed to operate at a fixed amplitude and a variable frequency during a portion of said deceleration mode.

7. The stick-slip piezo motor system as in claim 1, wherein said piezo motor is a multi-phase motor and wherein said at least one oscillating piezo element is a plurality of oscillating piezo elements and wherein said at least one moving friction element is a plurality of oscillating friction elements.

8. The stick-slip piezo motor system as in claim 7, wherein said piezo motor first accelerates during an acceleration mode, then operates at a constant speed during a constant speed mode, and then decelerates during a deceleration mode, wherein said computer is programmed to operate at a fixed amplitude and a variable frequency during at least a portion of said acceleration mode, wherein said computer is programmed to operate at a variable amplitude and a fixed frequency during said constant speed mode, and wherein said computer is programmed to operate at a fixed amplitude and a variable frequency during a portion of said deceleration mode.

9. The stick-slip piezo motor system as in claim 7, further comprising a plurality of alternating voltage sources, wherein each of said plurality of alternating voltage sources provides alternating voltage to one of said plurality of oscillating piezo elements so that each one of said plurality of oscillating piezo elements oscillates out of phase with respect to the other of said plurality of oscillating piezo elements.

10. The stick-slip piezo motor system as in claim 1, wherein said at least one oscillating piezo element is two piezo elements.

11. The stick-slip piezo motor system as in claim 10, wherein said two piezo elements are connected to the same side of a piezo housing, wherein both of said two piezo elements are expanding together or contracting together when both are operating in a stick phase.

12. The stick-slip piezo motor system as in claim 10, where said two piezo elements are connected to the opposite side of a piezo housing, wherein one of said two piezo elements is expanding while the other of said two piezo elements is contracting when both are operating in a stick phase.

13. The stick-slip piezo motor system as in claim 1, wherein said desired travel direction is linear.

14. The stick-slip piezo motor system as in claim 1, wherein said desired travel direction is rotational.

15. The stick-slip piezo motor system as in claim 1, wherein said piezo motor allows planar movement of said at least one moving friction element.

16. The stick-slip piezo motor system as in claim 1, wherein said at least one oscillating piezo element is at least three piezo elements.

17. The stick-slip piezo motor system as in claim 1, wherein said plurality of piezo friction elements are ceramic friction elements.

18. The stick-slip piezo motor system as in claim 1, wherein said at least one moving friction element is a sliding friction element.

19. The stick-slip piezo motor system as in claim 1, wherein at least one moving friction element is a rotational friction element.

* * * * *